UNITED STATES PATENT OFFICE.

CARLETON ELLIS, OF MONTCLAIR, NEW JERSEY.

HYDROGENATING RESISTANT FATTY MATERIAL FOR EDIBLE PURPOSES, &c.

1,261,911.  Specification of Letters Patent.  Patented Apr. 9, 1918.

No Drawing.  Application filed January 9, 1915. Serial No. 1,457.

*To all whom it may concern:*

Be it known that I, CARLETON ELLIS, a citizen of the United States, and a resident of Montclair, in the county of Essex and State of New Jersey, have invented certain new and useful Improvements in Hydrogenating Resistant Fatty Material for Edible Purposes, &c., of which the following is a specification.

This invention relates to a process of treating oily material, involving the esterification of fatty acids and the like and preferably the conversion of the esterified products, as by means of hydrogen addition into products of improved quality or consistency.

The present invention contemplates the treatment of fatty acids such as oleic, linolic, linolenic acids and the like with glycerin or other esterifying material of equivalent character to form the various glycerids of such fatty acids. While, tri-glycerids may be prepared, it is more particularly the object to produce mono and di-glycerids of such fatty acids, or other acids reacting in a like manner. It is further an object to esterify fats or oils containing more or less free fatty acid to produce a less acid or substantially neutral product. Another object of the invention is to produce from stearic acid or similar saturated acids the mono, di and tri-glycerids or other ester. Besides glycerin, various other bodies containing the hydroxy group may be employed, especially hydroxylated bodies which are relatively non-volatile or have high boiling or volatilizing points; including certain of the sugars and starches, especially soluble starch and the like and dextrin and also in some cases hydroxy bodies of the phenol class, including phenol, cresol, and homologues and also naphthol and analogous bodies.

In carrying out the stage of esterification the conditions of treatment, such as the degree of pressure and temperature may be varied, but I prefer in the case of glycerin to bring about reaction at a temperature usually above 200° and preferably between 250 and 290° C., or just below the boiling point thereof and as I shall use glycerin as the type of hydroxy body well suited to illustrate the present invention, the data given herein may be regarded as more particularly adapted for such hydroxy body and as not necessarily applicable to other hydroxy bodies of different physical or chemical characteristics. By suitable variation of the conditions of operation according to the information herein given coupled with the application of the common expedients of chemical art, such esterification may be obtained with a variety of bodies in greater or less degree according to circumstances.

Specifically, with regard to the esterification stage involving the illustrative hydroxy compound, glycerin, the following conditions afford excellent results. The oil and glycerin in the desired proportion to produce the particular ester or mixture of esters desired, is heated to near the boiling point of glycerin under normal atmospheric pressure, or about 250–285° C., while a current of hydrogen gas is passed rapidly through the mixture for a period of time, until the requisite amount of the ester has been formed.

As an illustration of this procedure 56 parts by weight of a commercial oleic acid, known as red oil, was heated with 18 parts of glycerin for 2½ hours at a temperature of 250–285° C., when the acid number of the red oil which originally was 188.5 was found to be reduced to 0.2. A small amount of distillate was obtained, consisting largely of water and a little oil. During the entire period of 2½ hours a current of hydrogen was passed through the mixture so as to maintain the reacting ingredients in a non-oxidizing atmosphere, while the gas current also served to stir the material and to bring about thorough mixing. The original red oil had a very disagreeable rancid odor, while the esterified product had no objectionable odor, and in fact was practically odorless.

A quantity of the same red oil heated in a current of hydrogen gas for a like period and at the same temperature but without glycerin, yielded a final product which was very dark in color, having an unpleasant odor and possessing an acid number of about 130, thus showing the beneficial effect of the glycerin on the properties of the fatty material. This lactone or anhydrid product may be partially esterified with glycerin and then hydrogenated as aforesaid.

In a similar manner a sample of whale oil, known as #3, having a very strong and unpleasant fishy odor and possessing an acid number of about 25 was treated with 5% of glycerin under like conditions and the acid number was reduced to approximately 1. The fishy odor almost if not entirely disappeared by such treatment.

In a like manner oils containing a considerable content of fatty acid including such oils as corn, cottonseed, linseed, Chinese wood, fish or menhaden, lard, tallow and other animal or vegetable oils or fats may be treated with the esterifying agent, to produce a substantially neutral product when desired, or to reduce the acidity to the desired degree, producing from the fatty acid contained in such oil, mono, di or tri-glycerids, but preferably the former or a mixture thereof. A certain amount of polymerization sometimes takes place resulting in a polymerized oil which is esterified more or less, yielding as a new product the polymerized mono or di-glycerid alone or in admixture with tri-glycerid, such as may be present normally in the oil.

After the esterification stage has been completed a hydrogenating catalytic agent may be added to the oil, including such catalyzers as reduced nickel, nickel oxid, or nickel salts or other of the base metal catalyzers or of the platinum group of metals including palladium and the like, so that in the presence of hydrogen the unsaturated components of the new fat become hydrogenated to a greater or less extent, producing a hydrogenated product containing the mono or di-gylcerid artificially produced in this manner.

While the esterification operation under the conditions stated, takes place at a temperature between 250–300° C., the hydrogenation operation with nickel catalyzer proceeds advantageously at about 180° C., so that the temperature should be allowed to fall to that point, in order to bring about hydrogenation. If palladium is employed the temperature may be still lower.

Many oils or fats that have a considerable amount of free fatty acid and are generally speaking of a highly rancid nature, inhibit the action of nickel and similar catalyzers, so that the commercial hydrogenation of such products is very difficult. If the fatty acid is first removed by alkali treatment a considerable proportion of the oil is lost and the fatty acid, generally speaking is useful only as low grade soap stock. By the present invention the fat is rendered available for hydrogenation and after hydrogenating, if desired the fat may be saponified by the autoclave system or otherwise, and the glycerin recovered and used again. The fatty acids resulting from the latter operation may be pressed if desired to obtain stearic acid and any unsaturated oil that may have escaped the hardening treatment may be subjected to the esterification anew. In this manner stearic acid may be obtained from red oil or oleic acid, while the glycerin employed may be used repeatedly.

In the esterifying operation the oil or fat or fatty acid may be beaten up by a mechanical agitator or stirrer or other expedients such as spray treatment may be used to aid in effecting a satisfactory reaction. In like manner, gases such as nitrogen, carbon dioxid or monoxid or hydro-carbon vapors may be employed in lieu of hydrogen, during the esterifying operation. When the gas treatment is omitted entirely a vacuum may be employed and the temperature correspondingly reduced, and at a later stage being raised to distil off any excess of glycerin.

During the treatment it is usually desired to avoid the formation of lactones and anhydrids, which may be minimized by careful temperature regulation, while on the other hand, if these bodies are to be produced to some extent the conditions should be regulated to that end. Hydrogenated fatty acid lactones may be produced in this manner.

When a nickel oxid or nickel carbonate and the like is added to the oil at the esterification temperature in the presence of hydrogen gas the oxid is reduced to sub-oxid or to the metallic state, as the case may be, and on lowering the temperature to a point below 200° C., usually between 165–180° C., the hydrogenation stage progresses readily. One or two per cent. of the nickel material is usually sufficient for this purpose.

Many varieties of marine animal oils contain much free fatty acid or other components which affect the ordinary nickel catalyzer and preclude a rate of hydrogenation which is satisfactory from the commercial standpoint. Cod oil for example often exhibits an acid number of 20 or more and such oil is difficult to hydrogenate. By treatment with glycerin the hydrogenation step may be carried out and hard fats produced as well as various tallowy bodies which may be used for stuffing leather, as for example harness leather. This hardened cod oil may be mixed with dégras, wool grease, Japan wax, paraffin wax, and the like, to form a suitable stuffing fat of the requisite consistency.

Up to the present time mono-glycerids have not been detected in fats. Di-glycerids have been found solely as dierucin in old rape oil. Lewkowowitsch claimed by partial saponification with aqueous alkali to obtain mono and di-glycerids, but careful investigations by Marcusson showed no certain proof of the presence of the lower glycerids.

The mono and di-glycerids and their hydrogenated derivatives, mono-stearic glycerid, both alpha and beta, the isomeric diglycerids including oleostearic glycerid and di-stearic glycerid may be used in edible and pharmaceutical preparations and for various industrial purposes.

What I claim is:—

1. The process of producing hardened fat from acid fatty material containing unsaturated bodies which comprises heating such fatty material with an esterifying agent comprising glycerin until the acid number of such fatty material is reduced to a relatively low point and in subsequently contacting the product with hydrogen and a hydrogenating catalyzer, until a substantial amount of said unsaturated material has been saturated with hydrogen.

2. The process of producing hardened fat from acid fatty material containing unsaturated bodies which comprises heating such fatty material with an esterifying agent until the acid number of such fatty material is reduced to a relatively low point and in subsequently contacting the resulting material with hydrogen and a hydrogenating catalyzer until a substantial amount of said unsaturated bodies have been saturated with hydrogen.

3. A process of producing hardened fat from acid fatty material which comprises subjecting such fatty material to the action of glycerin in the presence of hydrogen at a temperature above 250° C. until the acid number of such fatty material is reduced to a relatively low point, adding a catalyzer to the heated fatty material, reducing the temperature and continuing the contact of hydrogen.

4. A process of producing hardened fat from acid fatty material which consists in subjecting such fatty material to the action of glycerin in the presence of hydrogen at a temperature above 250° C. until the acid number of the fatty material is reduced to a relatively low point, adding a nickel-containing catalyzer to the fatty material, reducing the temperature to about 180° C. and continuing the contact of hydrogen.

5. A process of producing hardened fat from strongly acid fatty material which comprises subjecting such fatty material to the action of a high boiling body containing the hydroxy group adapted to esterify fatty acids, at a temperature above 250° C. in the presence of a hydrogen containing gas until the acid number of the fatty material is reduced to a relatively low point, adding a catalyzer to the fatty material, reducing the temperature thereof and continuing the contact of the hydrogen containing gas.

6. The process of producing hardened fat from acid fatty material containing unsaturated bodies which comprises subjecting such fatty material to the action of an esterifying agent at a temperature above 200° C., until the acid number of such fatty material is reduced to a relatively low point and in subsequently contacting the resulting material with hydrogen and a hydrogenating catalyzer until a substantial amount of said unsaturated bodies have been saturated with hydrogen.

7. The process of producing hardened fat from acid fatty material containing unsaturated bodies which comprises subjecting such fatty material to the action of an esterifying agent at an esterifying temperature until the acid number of such fatty material is reduced to a relatively low point and in subsequently contacting the resulting material with hydrogen and a hydrogenating catalyzer until a substantial amount of said unsaturated bodies have been saturated with hydrogen.

Signed at Montclair, in the county of Essex and State of New Jersey this 8th day of January A. D. 1915.

CARLETON ELLIS.

Witnesses:
 ENID CURTIS,
 B. M. ELLIS.